3,291,679
REACTION PRODUCT OF A POLYMERIC ALPHA-OLEFIN-MALEIC IMIDE-AMINE AND AN EPIHALOHYDRIN AND SIZING PAPER THEREWITH
Joseph P. O'Brien, Kirkwood, Mo., assignor to Monsanto Company, St. Louis, Mo., a corporation of Delaware
No Drawing. Filed June 29, 1965, Ser. No. 468,163
17 Claims. (Cl. 162—164)

This application is a continuation-in-part of copending application, Serial No. 319,499, filed October 28, 1963, now abandoned.

This invention relates to novel paper treating agents, their preparation and application to paper web, and paper sized therewith.

Various types of quality paper used for packaging, printing, writing and photographic purposes are conventionally provided with some type of a size to control the absorption and penetration of ink, water and other types of suspensions and solution. Although numerous sizing compositions, both natural and synthetic, have been extensively used in the past, they are deficient in one or more respects. For example, some materials which provide excellent sizing qualities have a deleterious effect upon the dry tensile strength of the treated paper. Likewise, a great many of the sizing compositions are quite adequate under slightly acidic conditions, but are incapable of producing a hard sizing under alkaline or neutral conditions.

Therefore, it is an object of the present invention to provide new and novel paper treating compositions overcoming the disadvantages of the prior art. It is also an object to provide improved compositions which enhance strength characteristics of the paper. A more specific object is to provide a hard sizing on paper under acid, neutral or alkaline conditions. Another object is to provide an improved paper sized with the compositions of the present invention.

These and other objects are accomplished in accordance with the present invention, generally speaking, by adding to a paper web or papermaking fibers a dilute aqueous solution or suspension of the reaction product of a polymeric alpha-olefin-maleic imide-amine and an epihalohydrin and adsorbing or absorbing the polymeric composition on the fibers or paper. More specifically, the present invention is predicted on compositions obtained by reacting a copolymer of maleic anhydride and an alpha-olefin with a diamine, having at least one primary amino group, heating such reaction mixture to form the polymeric imide-amine therefrom, reacting the resultant imide-amine with an epihalohydrin, and treating the epihalohydrinated product thus obtained with sufficient acid to stabilize it against gelation in storage and transit.

Substantially all of the polymeric compounds under consideration are water soluble and thus readily applicable to papermaking fibrous materials or to paper webs by conventional methods. The compositions of this invention which are more or less water insoluble can be easily suspended or emulsified in aqueous media so as to render them convenient for use. Additionally, the present compositions can be cured in relatively short periods of time. These attributes provide an almost unlimited latitude in the methods of applying and curing these compositions. For example, the present compositions can be added directly to the pulp slurry prior to sheet formation or can be sprayed on the web while on the machine. Alternately, they can be readily applied to finished paper stock by spraying, impregnation and other conventional methods. Likewise, the present compositions can be cured on the machine or, if desired, by storage at ambient temperatures for relatively short periods of time. Although these polymeric products are susceptible to rather rapid gelation, this tendency can be readily counteracted by treating with an acid.

The acidified lower molecular weight polymeric imide-amine/epihalohydrin reaction products, i.e., those derived from imides having viscosities below about 0.6, e.g., those prepared from alpha-olefin hydrocarbon/maleic anhydride copolymers usually require treatment or reaction with an alkaline material shortly before or during the sizing opeation to enhance or activate their sizing efficiency. With such products it is preferred to disperse the acid-stabilized size in water or other aqueous media, and to incorporate sufficient alkali, such as sodium hydroxide, potassium hydroxide, ammonia, or ammonium hydroxide to elevate the pH of the resulting solution to approximately 9 to 11. I call this the "pretreatment" step. The pretreated size is then added to a pulp slurry, and the pH of the slurry is adjusted to a lower level, preferably in the neighborhood of about 4.5 to 8.5 by the addition of an acid prior to sheeting of the treated pulp. Alternatively, the pH of the pretreated size can be lowered prior to addition to the pulp. With the polymeric imide-amine/epihalohydrin reaction products having imide specific viscosities, of about 0.6 or higher, say up to about 3 or slightly higher, e.g., those made from $C_{10}$ to $C_{13}$ alkyl vinyl ether/maleic anhydride copolymers, effective sizes can be made which do not require pretreatment with a base to get effective size results.

The complex compounds of the present invention are believed to be polymeric epoxyalkyl quaternary ammonium salts. They are substantive to cellulose and readily unite therewith. The exact mechanism of their joinder with cellulose is not completely known, but results in the formation of webs having superior qualities.

The alpha-olefin-maleic anhydride copolymer utilized as a starting material in the preparation of the present sizes usually contains essentially equimolar proportions of the alpha-olefin and maleic anhydride units. However, in the commercial preparation of the copolymer, copolymers in which the molar ratio of maleic anhydride to alpha-olefin is from about 0.90:1 to about 1.8:1 can be utilized. Copolymers having about equimolar amounts of maleic anhydride are preferred. Any available copolymers can be used, but copolymers containing very much less than about 0.9 moles of maleic anhydride per mole of alpha-olefins result in sizes that are, at best, only difficultly soluble or dispersible in water. On the other hand, copolymers containing excessive proportions of maleic anhydride yield inferior sizes. The best sizes are made from copolymers having substantially alternating maleic anhydride-olefin moieties. The copolymers are prepared in conventional manners with or without solvents such as benzene or xylene, and using catalysts such as azobis(isobutylronitrile), di-t-butyl peroxide, t-butyl perbenzoate, benzoyl peroxide, and any initiator which will be effective at from about 50–150° C. such as isopropyl peroxydicarbonate, tetrachlorobenzoyl peroxide and the like. The polymers employed in accordance with this invention have molecular weights of at least about 2,000, and may range up to the general neighborhood of about 200,000–225,000. Molecules of excessive size introduce operational difficulties such as a rapidly increasing tendency to gel, reduced ease of application, and the like; whereas polymers having a molecular weight substantially under 2,000 provide less satisfactory sizes. The molecular weight of the copolymer used, however, is not as critical as is the viscosity of the imide-amine made therefrom, that is, the imide viscosities reflect the quality of the copolymer that was used in the manufacture of the imide. However, it is considered that the better copolymers used in this work preferably have an average molecular weight of from about 50,000 to about 115,000 and that a polymeric imide properly made therefrom has an average molecular weight of from about 60,000 to about 150,000. Copolymers and imides made therefrom having these molecular weights are generally those made from alkyl vinyl ether/maleic anhydride copolymers and an amine mixture of N,N-dialkylaminoalkylene diamine and N-(hydroxyalkyl)alkylenediamines. Polymeric imide/epihalohydrin reaction products made therefrom usually need to pretreatment with an alkali prior to their application to the aqueous cellulose pulp slurries.

The terms "aplha-olefin" and "olefin" are used herein as general terms to designate olefinically unsaturated compounds in which the double bond is in the alpha position, and is intended to include not only olefinically unsaturated branched and straight chained hydrocarbons such as the aliphatic olefins, e.g., ethylene, propylene, 1-butylene, 1-pentylene, 1-hexene, 1-octene, 1-nonene, 1-decene, 1-dodecene, 1-tridecene, 1-tetradecene, 1-pentadecene, 1-hexadecene, 1-octadecene, 1-eicosene, 1-docosene, 1-tetracosene, 1-pentacosene, etc. and the aromatic alpha-olefins such as styrene, alkyl-substituted styrenes such as vinyltoluene, the vinylxylenes, vinyl-4-ethylbenzene, the chloro-substituted styrenes, etc. but is also intended to include other alpha-olefinically unsaturated polymerizable compounds such as alkyl vinyl ethers having about 8 or more carbon atoms in the alkyl groups, the corresponding alkenyl vinyl ethers having at least about 8 carbon atoms in the alkenyl group where sizing action is being sought. When it is desired to impart some wet or dry strength to the paper made from pulp treated with these polymeric imide-amine/epihalohydrin reaction products the alpha-olefin used may also include the shorter chained olefins hydrocarbons, alkyl vinyl ethers, as well as such unsaturated acid monomers such as acrylic acid and methacrylic acid, vinyl esters such as the vinyl alkanoates including vinyl acetate, vinyl propionate, etc., the acrylate and methacrylate esters, such as methyl methacrylate, ethyl acrylate, and vinyl compounds such as vinyl chloride, vinyl alcohol, etc. Mixtures of the alpha-olefins may be used to react with the maleic anhydride to make the copolymer materials used for this invention, e.g., mixtures of alkyl vinyl ethers and vinyltoluene may be reacted with maleic anhydride to prepare useful copolymers. Thus the term "copolymer" as used herein includes the use of interpolymers of more than two monomer materials.

The alpha-olefins used in preparing the copolymers can vary considerably in molecular weight and can contain an average of from 2 to about 40 carbon atoms. The hydrocarbon alpha-olefins can be obtained from naturally occurring compounds or by the polymerization or cracking of petroleum fractions and the like. In commercial practice, they are generally mixtures containing compounds of varying length. Therefore, the number of carbon atoms attributed to such mixtures represents a weighted average rather than an absolute value. Those copolymers prepared from the lower olefins (say, up to about 12 carbon atoms) result in the formation of products which provide improved wet and dry strength, with or without sizing whereas utilization of the higher olefins provides hard sizing in addition to the other advantageous properties.

Vinyl ethers, which may be used in preparing the copolymers used to prepare the paper treating chemicals of this invention, may be prepared in conventional manner by treating an alcohol with an alkali catalyst followed by reaction with acetylene. The alcohols used can be straight or branched chained, obtained from natural products or be synthetically made, e.g. those alcohols resulting from the "oxo" and other processes. The vinyl ethers have the general formula

$$Z-O-CH=CH_2$$

wherein Z is alkyl, alkenyl, aryl, alkoxyalkyl, aryloxyalkyl, alkylarl and the like containing from 2 to about 40 carbon atoms and preferably from about 8 to about 32 carbon atoms if hard sizing is desired. Representative vinyl ethers include, e.g., the alkyl vinyl ethers such as the oxo-decyl, oxo-tridecyl, oxo-hexadecyl, oxo-nonadecyl, propyl, hexyl, n-decyl, n-dodecyl, n-octadecyl, n-tetracosyl, n-tritriacontyl, tetratricontyl, n-hexatriacontyl vinyl ethers, the corresponding alkenyl vinyl ethers, a few examples of which are dodecenyl vinyl ether, heptadecenyl vinyl ether and octadecenyl vinyl ether, as well as the aryl, aralkyl, and alkaryl alkoxyaryl, aryloxyaryl, aryloxyalkyl vinyl ethers, e.g., phenyl, benzyl, tolyl, xylyl, dodecylphenyl, octadecylphenyl, dinonylphenyl, methoxyphenyl, ethoxyphenyl, dodecyloxyphenyl, octadecyloxyphenyl, phenoxyhexyl, phenoxyoctyl, phenoxyoctadecyl vinyl ethers, and the like.

For reasons of availability and favorable cost maleic anhydride is preferred as the alpha-beta-olefinically unsaturated polybasic carboxylic acid anhydride comonomer in preparing the copolymers which are used in the process of this invention. However, unsaturated polybasic acid anhydrides, in general, having from 4 to about 10 carbon atoms could readily be used to prepare the copolymers and are included as being useful in this invention. Examples are anhydrides such as itaconic acid anhydride, citraconic acid anhydride, and other copolymerizable related homologous unsaturated polybasic carboxylic acid anhydrides.

The diamines or diamine mixtures employed in the formation of imides by reaction with the alpha-olefin-maleic anhydride copolymer can vary considerably in structure and reactivity. It is only necessary that the diamine and the copolymer are capable of being dissolved in a mutual, inert solvent. However, for the purposes of the present invention, it is preferred to employ diamines of the structure,

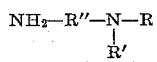

$$NH_2-R''-N-R \atop R'$$

wherein R and R' are hydrogen, alkyl groups containing from 1 to about 22 carbon atoms, aralkyl groups containing from 7 to 10 carbon atoms, hydroxyalkyl groups having from 2 to about 4 carbon atoms, and R'' is an alkylene radical containing at least two carbon atoms and generally not greater than about 20 carbon atoms. The preferred amines are alkylenediamines containing from 2 to about 30 carbon atoms. If desired, R'' may be phenylene or alkyl substituted phenylene. The diamino compounds employed can be substituted or unsubstituted. When substituents are present in R, R' and R'', it is only necessary that they are less reactive with the anhydride than is the primary amino group, and that they are not alpha to the nitrogen atoms. Suitable non-interfering substituents include hydroxy, cyano, acetyl, aryl, benzoyl, tert.-amino, ether groups, sulfonyl, arylthio, alkylthio and the like.

It is generally preferred that neither R nor R' in the above formula be hydrogen. In other words, it is preferable to employ tertiary amines of the above type with a low degree of steric hindrance in the process of the present invention. The use of a tertiary amine at this point in the synthesis reduces to a minimum any possibility of crosslinkage prior to reaction with the epihalohydrin compound. Reactivity of the amine mixture is enhanced when it contains at least about 30 mol percent of dimethylamino groups. In some instances, a secondary or even a primary amine can be employed to advantage in preparing the compounds of the present invention. Also, amines of the above type can be partially replaced with various other amines and amide-forming compounds such as N-alkyl trimethylene diamines in which the alkyl group is derived from coconut, soya and tallow fatty acids and which are commercially available under the trade name "Duomeen," butylamine, octadecylamine, various soluble ammonium salts, and the like.

Although it is preferable to use N,N-dimethylaminoalkylene diamines, and particularly N,N-dimethyl-1,3-propanediamine, numerous other diamines corresponding to the above general formula are suitable in the present process. Representative members of this group of diamines include, for example, N,N-dimethylethylenediamine, N-methylethylenediamine, N-ethylethylenediamine, N-hydroxyethylethylenediamine, N-hydroxypropylethylenediamine, N-hydroxypropyl-propylenediamine, N-hydroxypropyl-1,3-propanediamine, N-hydroxypropyl-1,6-hexanediamine, N-hydroxypropyl-2-oxa-1,6-hexanediamine, N-2-aminoethylpiperazine and N-3-aminomethylpyridine.

In conjunction with tertiary substituted diamines such as N,N-dimethyl-1,3-propanediamine, minor amounts (up to about 20 mol percent) of unsubstituted polyamines may be substituted in order to attain a higher viscosity in the product. Representative polyamines include ethylenediamine, propylenediamine, 1,6-hexanediamine, diethylenetriamine, iminobispropylamine, triethylenetetramine and tetraethylenepentamine. An example of a preferred mixture of amines which may be used is a mixture of about 66.5 equivalents N,N-dimethylaminoethylenediamine and about 28.5 equivalents of N-(2-hydroxyethyl)ethylenediamine for each 100 equivalents of maleic anhydride is an oxotridecyl vinyl ether/maleic anhydride copolymer.

The amidation-imidation of the maleic anhydride copolymer is generally preceded by mixing with the warm (70°–75° C.) copolymer-aromatic hydrocarbon (e.g. xylene) solution an appropriate alcohol to open the anhydride rings and to at least partially esterify the polymer. Lower alkanols having from 1 to 6 carbons and lower alkyloxyalkanols having up to about 6 or 8 carbons are preferred. Isobutanol and n-butanol are alcohols of choice. The addition of a small amount of tertiary amine in addition to the alcohol to the copolymer solution appears to promote or catalyze the desired preesterification. The chosen diamine or preferably the diamine mixture is then added rapidly to the esterified copolymer xylene-alcohol solution preferably warmed to 73°–105° C., and then kept at from about 110° C. to about 160° C. to replace ester groups and to form first amides and then cyclic imides, while distilling out water, alcohol, and xylene. The 110°–160° C. heating step to effect imidation usually is conducted for from 1 to 2 hours. Shorter heating times may be used if high free carboxyl content is not detrimental to the use intended. Longer heating times gives imides having low carboxyl content. Polymeric imide intermediates having about 15% or less carboxyl content are generally most satisfactory for paper treating applications. The resulting polymeric imides are usually obtained as high solid content mixture in the remaining solvent, e.g., as 70–80% solids in xylene mixture. This mixture is preferably diluted to about 30–45% polymer solids content with a lower alkanol such as 2-propanol while cooling to room temperature for reaction with the epihalohydrin.

The polymeric imide-amine formed by the reaction of the diamine with the maleic anhydride-alpha-olefin copolymer is treated with epihalohydrins to form the corresponding polymeric compound containing expoxypropyl groups. In the interest of convenience and economy, it is generally preferred to use epichlorohydrin in this capacity. However, other epihalohydrins can also be used. The reaction between the epihalohydrin and the polymeric imide-amine can be conveniently carried out at room temperature by adding an appropriate amount of the epihalohydrin to a water diluted solution of the polymeric imide in a conventional solvent such as butanol, ethoxyethanol, butoxyethanol, butoxy carbitol, methanolxylene mixtures, isopropanol-toluene mixtures and the like. Since the reaction is not instantaneous, the amount of the epoxide entering the reaction can be controlled by the reaction time as well as by the amount of the epoxide added to the mixture. Although the reaction progresses slowly in the absence of appreciable water, it is catalyzed and proceeds quite rapidly upon the addition of water. When water is added, the aqueous mixture originally becomes somewhat turbid. This turbidity of the aqueous reaction mixture may usally be dissipated, if desired, by dissolving the reaction product in aqueous mixtures of 2-propanol, e.g. a 2:1 volume water:2-propanol mixture. The resulting solution can then be diluted with additional water to any desired concentration. A portion of the epoxide is hydrolyzed in the aqueous system to the corresponding glycol. Thus, the epoxide content of the polymeric product is normally somewhat less than the quaternary content when N,N-dimethyl-1,3-propanediamine is used as the diamine. The degree of hydrolysis of the epihalohydrin or other epoxide can be controlled within limits by controlling alkalinity and by other well-known methods, thus providing an additional means of tailoring the properties of the product.

Although sufficient epoxide can be made available to react with all of the amine groups in the polymer, it is preferred that the polymeric compounds contain some free amino groups together with the quaternary groups. In general, the numerical ratio of epoxide groups, including hydrolyzed epoxides, to cyclic imide groups can vary between about 0.1:1 and 1:1. It is preferred to maintain this ratio between about 0.3:1 and about 0.9:1.

The polymeric epoxyalkyl compounds thus obtained have a relatively short shelf of storage life since they are subject to crosslinking and gelation. In order to stabilize them in a convenient, commercially available form they are preferably treated with a hydrohalic acid, either alone or in combination with other mineral acids such as phosphoric, sulfuric and the like. Alternately, the compounds may be stabilized with a mineral acid composition containing no hydrohalic acids. Such stabilizing compositions neutralize amino groups present, but do not add to the epoxides. When substantially halide-free acid compositions are used for stabilization, some halide ion is present due to the epihalohydrin in the system, and adds to the epoxides. In any event, sufficient halide ion must be present to effect stabilization of the epihalohydrin groups in the product. This treatment with the hydrohalic acid converts the polymeric epoxyalkyl compounds to the corresponding more stable haloalkanol compounds which essentially stops further reaction or polymerization. These polymeric alkanols are stable for long periods of time, and thus can be subjected to normal shipping and storage without any danger of crosslinkage or consequent gelation.

With the acid stabilized polymeric imide-amine epihalohydrin reaction products derived from alpha-olefin hydrocarbon/maleic anhydride copolymers it is generally desirable to pretreat them with an alkaline material, i.e., a base such as an alkali metal hydroxide to put them in a chemical form most suitable to efficiently size the cellulose pulp or paper. Similar acid stabilized products prepared from the alkyl vinyl ether/maleic anhydride copolymers, and generally those from more viscous imides, do not generally require such pretreatment before application to the pulp slurry or paper. This alternative is of great benefit to the paper-maker users of the reaction product in that these products obviate any necessity for expensive machinery to pretreat the chemical size composition before application to the pulp.

Based upon the best information currently available, the active groups in these polymeric alpha-olefin/maleimide-amine epihalohydrin reaction products are believed to be polymeric epoxyalkyl quaternary ammonium salts containing randomly recurring units of the following structures when the alpha-olefin used is a hydrocarbon alpha-olefin:

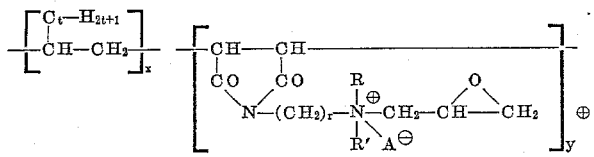

wherein R and R' can be hydrogen, alkyl groups containing up to 22 carbon atoms, hydroxyalkyl groups having from 2 to about 4 carbon atoms and aralkyl groups containing up to 10 carbon atoms, A is chloride, bromide, or iodide,
$r$ is a whole number from 2 to 20,
$t$ is a positive whole number up to about 40, and
$x$ and $y$ are numbers greater than 0, the preferred ratio of $y$ to $x$ being at least about 0.9:1.

Since the present polymeric sizes preferably contain free amino groups and can also contain non-epoxy quaternary groups, the following general formula illustrates the type of randomly recurring units that may be present

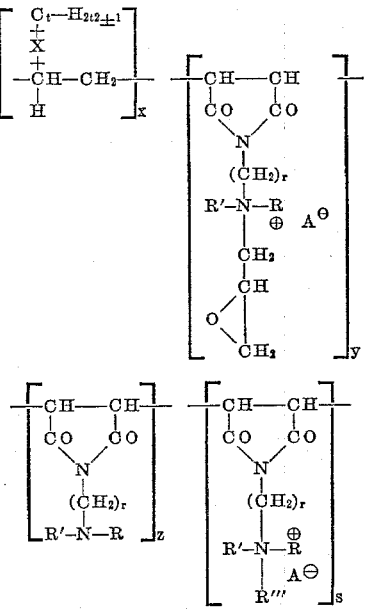

wherein X denotes the oxygen or sulfur of an alkyl or alkenyl oxy or thio ether, or a -phenylene-carbon atom bridge, and wherein R, R', A, $r$ and $t$ have the above-assigned values, R''' is an alkyl or a mono- or dihydroxy alkanol group containing 1 to 3 carbon atoms or an aralkyl group containing 7 to 10 carbon atoms, and $x$, $y$, $z$ and $s$ are whole numbers, with $s$ being between 0 and about 75% of the sum of $y$, $z$ and $s$; $y$ being equal to at least about 10% of said sum, and the ratio of said sum to $x$ being at least about 1:1.

As pointed out above, this type of material has a propensity to crosslink and to form a gel and this is good in a paper web. But to prevent premature gelation, as during storage before use, they can be readily converted to the corresponding alcohols, or more precisely the corresponding 1-substituted-2-alkanols, by stabilization with a hydrohalic acid, particularly hydrochloric acid. It is not necessary to convert all of the quaternary ammonium salts to the corresponding alkanols, but it is only required that the stabilized form of the composition contain a preponderant proportion of the alcohols. It is preferred that enough acid be added to reduce the pH to below about 3.0 to insure product stability. The stabilized polymer derivative obtained by the acidification is believed to be a polymer having randomly recurring units of the following structures when the alpha-olefin of the copolymer is a hydrocarbon.

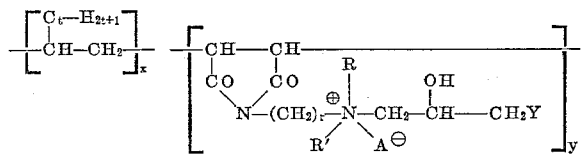

wherein

R, R', A, $r$, $t$, $x$ and $y$ have the above-assigned values, and
Y is chloride, bromide or iodide.

The invention and the manner in which is accomplishes its objects will be more readily understood by reference to the following detailed description of preferred embodiments thereof. In these examples and throughout the application, all proportions are expressed in parts by weight unless otherwise indicated. To show the effectiveness of the sizing method of this invention the more difficultly sized bleached pulps were used to prepare the papers.

EXAMPLE 1

A mixture of about 380 grams (1.5 mols) of 1-octadecene and 50 ml. of butyl acetate was warmed to about 135° C. in a 1-liter flask under an atmosphere of carbon dioxide. Then 2.5 ml. (0.0135 mol) of di-tert-butyl peroxide was added, followed by the slow addition, with continuous stirring during a period of 2½ hours, of a warm (40–50° C) solution of approximately 147 grams (1.5 mole) of maleic anhydride and 2.5 ml. (0.0135 mol) of di-tert-butyl peroxide in 200 ml. of butyl acetate. The temperature of the reaction mixture was maintained at about 135° C. for approximately 4 hours, at which time the infrared spectrum of the polymeric solution showed that all the maleic anhydride was consumed. The temperature was then raised to about 200° C. while butyl acetate was distilled out, and the pressure was gradually lowered to about 40 mm. of mercury, resulting in recovery of substantially all the butyl acetate. The pressure was then reduced further to about 2–3 mm. of mercury to recover 60.5 grams of unreacted olefin at a final flask temperature of 210° C. The residue of polymer weighed about 463 grams. Since a negligible amount of maleic or succinic anhydride distilled out, the average ratio of olefin to maleic anhydride in the polymer was about 0.84:1. The specific viscosity at 4% concentration in methyl ethyl ketone was 0.34, corresponding to a molecular weight of about 4,400.

A solution of about 30.9 grams of the above polymer (containing 0.1 mol of anhydride) in 30 ml. of xylene was treated dropwise at approximately 140° C. with about 10.2 grams (0.1 mol) of N,N-dimethyl-1,3-propane-diamine. The mixture was held at a reflux temperature of 140° C. for 2 hours while the water of reaction was distilled off. The temperature was then raised to about 155° C. to remove most of the xylene, the remainder being removed by codistillation with added butanol. The residue, about 66 grams of a butanol solution of the polymeric imide, was cooled to 24° C. To this solution were added about 8 ml. (0.1 mol) of epichlorohydrin and 15 ml. of water. The resulting cloudy suspension warmed to about 30° C. and became clear in about 20 minutes. An additional 20 ml. of water was added gradually during the next 20 minutes at 30–32° C. The mixture remained completely clear upon further addition, and 15 ml. of water and about 10 ml. of concentrated HCl were added gradually while the pH was held between about 3 and 4. It was further diluted to about 420 grams, and an additional 0.7 gram of concentrated HCl added.

The composition and properties of the polymeric anhydrides used in this invention are dependent upon the amount and mode of addition of the maleic anhydride, and also upon the solvent, the temperature, and the amount of catalyst used. This relationship is well illustrated in Table I below, in which the preparation of the anhydride of Example 1 is summarized under the designtaion of "Polymer 1." The remaining polymers set forth in this table were prepared in the same general manner as described in Example 1, with any significant modifications being indicated. In those instances in which the anhydride was premixed with the olefin, or added rapidly to the reaction vessel, the time for the anhydride addition is designated as zero. No total reaction time is given for Polymers 5 through 6. In these cases, the reaction conditions were maintained until the infrared spectrum of the polymeric solution indicated that all of the maleic anhydride was consumed. This usually involved from about 4 to 8 hours. The viscosity given is the specific viscosity of a 4% solution in methyl ethyl ketone at 25° C. All other entries in the table are self-explanatory.

evaporator to remove the methanol. It was then brought to a weight of 210 grams by the addition of water. The resulting solution had a solids content of approximately 21%.

As indicated above, the sizing compositions of the present invention can be applied to cellulosic fibers in various ways. The following examples describe preferred methods of application than can be employed to obtain the beneficial results of the present invention.

EXAMPLE 3

A sample of the sizing agent as described in Example 1 was diluted with water to a concentration of about 0.3%. One hundred milliliters of this solution was then added to about 1½ liters of a 2% slurry of a bleached sulfite softwood pulp which had been refined to a freeness of about 500 cc. (Canadian Standard Freeness). The mixture was stirred thoroughly, and the pH was adjusted to about 9 by the addition of dilute sodium hydroxide solution. Handsheets were then formed and dried on a Noble and Wood handsheet machine using water adjusted to an approximate pH of 9 for dilution of the stock. The handsheets thus formed had a basis weight of 42 pounds, 25 x 40–500. Properties of these handsheets are reported hereinafter.

EXAMPLES 4–13

In a manner similar to that described in Example 3, the sizing agents listed in Table II below were applied to the indicated pulps which had been previously re-

| Polymer | Olefin | Moles | | Catalyst (mols) | Solvent | ml. | Reaction Temp. °C. | Time (hrs.) | | Polymer Properties | |
| | | Olefin | Maleic Anhydride | | | | | Anhydride Addition | Total | Mol Olefin per Mol Anhydride | Viscosity |
|---|---|---|---|---|---|---|---|---|---|---|---|
| 1 | Octadecene | 1.5 | 1.5 | 0.027 | Butyl Acetate | 300 | 135 | 2.5 | 6.5 | 0.84 | 0.34 |
| 2 | do | 0.9 | 0.9 | 0.024 | Xylene | 300 | 145 | 0.6 | 4.6 | 0.75 | 0.23 |
| 3 | "Adecene A–51"[1] | 1.5 | 1.5 | 0.041 | Butyl Acetate | 330 | 140–146 | 1.3 | 7.3 | 0.76 | 0.32 |
| 4 | Octadecene | 0.61 | 1.0 | 0.014 | Toluene | 150 | 131–133 | 0 | 8.0 | 0.61 | |
| 5 | do | 1.0 | 1.0 | 0.027 | Xylene | 300 | 145 | 0 | [2] | 0.72 | 0.24 |
| 6 | do | 1.5 | 1.5 | 0.02 | Butyl Acetate | 300 | 145 | 0 | [2] | 0.69 | 0.29 |
| 7 | do | 1.5 | 1.5 | 0.041 | Xylene | 300 | 145 | 2 | [2] | 0.86 | 0.22 |
| 8 | do | 1.5 | 1.5 | 0.02 | Butyl Acetate | 300 | 135 | 0 | [2] | 0.77 | 0.32 |
| 9 | 1-Octene | 2.0 | 2.0 | 0.027 | do | 300 | 135 | 0 | [2] | [3] | [3] |

[1] "Adecene A–51" is a commercially available mixture of $C^{14}$–$C^{18}$ alpha-olefins.
[2] To completion.
[3] Not isolated; used in solution.

EXAMPLE 2

A solution of 26 grams (0.1 mol of anhydride) of Polymer 2 in Table I in 50 ml. of ethoxyethanol was heated to about 130° C. A solution of about 10.9 grams (0.105 mol) of aminoethylaminoethanol in 20 ml. of ethoxyethanol was then added rapidly to the dissolved copolymer. The water of reaction was stripped off by distillation while the reaction mixture was kept at reflux temperature (about 141° C.) for a 4-hour period. The infrared spectrum of the polymer showed that substantially complete imide formation had occurred. After removing 50 ml. of the ethoxyethanol solvent by distillation, the temperature was reduced to about 60° C., and approximately 145 ml. of methanol was added. The temperature of the mixture was maintained at about 60° C., and about 8 ml. (0.120 mol) of epichlorohydrin was added. The progress of the reaction was followed by titrating aliquots of 2.00 ml. with Durbetaki Reagent (0.492 N anhydrous HBr in acetic acid). After approximately 2½ hours, the titer had decreased by 0.43 milliequivalents of HBr/ml. of solution equivalent to about 85–90% reaction of epoxide. The mixture was then neutralized with about 8.2 ml. of 11.5 normal HCl diluted with 200 ml. of water and vacuum stripped in a rotary fined to about 500 cc. (Canadian Standard Freeness.) These pulps were then formed into handsheets in substantially the same manner as described above. About one mol of the designated polymers of Table 1 was employed in the preparation of each size of these examples, and the molar proportions of the other reactants are as indicated. The amine used in each case was dimethylaminopropylamine. The amount of sizing agent added to the pulp slurry is presented in weight percent based on the dry pulp. In Examples 4–9, the pulp and the dilution water were adjusted with sodium hydroxide to about pH 9 in keeping with the procedure of Example 3.

In the remaining examples (10–13), as sample of each of the sizing agents was diluted to a concentration of about 0.3%. By the addition of a dilute sodium hydroxide solution, the pH of a 100-ml. portion of the 0.4% solution was then raised to between about 9.5 and 11, and maintained at this level for about 15 to 30 minutes. At the end of this pre-adjustment period, the samples were further diluted with about 250 ml. of water and then thoroughly mixed with the pulp slurry as in Example 3. The slurry containing the size was then adjusted to about pH 7, and the sheets were formed and dried as previously described using water also adjusted to about pH 7 for dilution of the stock.

Table II

| Example | Sizing Agent | | | | | | | Pulp |
|---|---|---|---|---|---|---|---|---|
| | Polymer | Amine | Epichloro-hydrin | HCl | Quaternization, percent | Chlorohydrin Substitution, percent | Percent on Pulp | |
| 4 | 3 | 1 | 1.02 | 0.7 | 80-90 | 37 | 1 | Bleached Softwood Sulfite. |
| 5 | 3 | 1 | 1.02 | 0.7 | 80-90 | 37 | 1 | Do. |
| 6 | 3 | 1 | 1.02 | 0.7 | 80-90 | 37 | 1 | Bleached Kraft Hardwood. |
| 7 | 9 | 1 | 1 | 0.5 | --- | 44 | 1 | Bleached Softwood Sulfite. |
| 8 | 4 | 1 | 1.02 | 0.7 | 80 | 18 | 1 | Do. |
| 9 | 2 | 1 | 1.02 | 0.95 | 64 | 38 | 1 | Do. |
| 10 | 7 | 1 | 1.02 | 1.3 | 37 | 38 | 0.7 | Do. |
| 11 | 5 | --- | --- | --- | --- | 10 | --- | |
| 12 | 6 | --- | --- | --- | --- | 70 | --- | |
| 13 | 8 | --- | --- | --- | --- | --- | --- | |

The manner in which the sizing agents of the present invention are added to the pulp is not particularly critical. For example, the amount of the size added to the slurry can vary within wide limits, and papermakers' alum may or may not be used. Likewise, the pH of the size prior to addition to the pulp can be varied, as well as the final pH. Alternately, a predetermined volume of a dilute alkaline solution can be added to a diluted portion of the size. Then, after a specified time, the treated portion may be neutralized or adjusted to a pH between about 4 and 9 by the addition of a mineral acid. This material can be added immediately to the pulp or stored for future usage. Paper sized with material in this manner can be formed into sheets with or without any further adjustment of the pH.

The papers treated with the sizes of Examples 4-9 were tested for both wet and dry tensile strength and resistance to water and ink penetration. The results of these tests, which clearly illustrate the advantages of the present invention, are set forth below.

Table III

| Paper From Example No. | Tensile Strength (lbs.) | | | Penetration Resistance | | |
|---|---|---|---|---|---|---|
| | Dry | Wet | | Water | | Ink After 1 Week, seconds |
| | | Initial | After 1 Week | Initial | After 1 Week | |
| 3 | 14.9 | 1.4 | 2.2 | 28" | 34" | 3,000 |
| 4 | 18.8 | 4.1 | 5.3 | 28" | 30" | 4,000 |
| 5 | 17.4 | 4.0 | 5.3 | 28" | 30" | 4,000 |
| 6 | 9.4 | 2.2 | 3.0 | 20" | 21" | 6,000 |
| 7 | 15.8 | 3.2 | 4.6 | 11" | 15" | 100 |
| 8 | 14.8 | 1.8 | 2.5 | 8" | 11" | 400 |
| 9 | 18.6 | 3.0 | 4.4 | 18" | 32" | 2,500 |
| Waterleaf, bleached softwood sulfite | 15.0 | 0.4 | 0.4 | 0.5" | 0.5" | 0 |
| Waterleaf, bleached Kraft-wood hardwood | 9.1 | 0.2 | 0.2 | 0.5" | 0.5" | 0 |

EXAMPLE 14

This example illustrates the preparation of a chemical size product that does not need to be pre-treated with a base prior to application to the pulp being treated therewith, using an alkyl vinyl ether as the co-monomer with maleic anhydride to prepare the polymer being used.

One mole, 226.4 g. of oxo-tridecyl vinyl ether (assay, 99.9%) was stirred and swept with nitrogen as it was heated to 72° C. with stirring by a high-torque stirring motor capable of about 50–500 r.p.m. and fitted with a blade closely conforming to the bottom of the 1 liter 4-necked flask. The flask was equipped with two accurately graduated addition funnels, the larger of which had a stopcock with an integral needle valve for constant drop rate adjustment, a thermometer, and a condenser closed by a bubble-counting seal containing mineral oil.

When the temperature had been stabilized at 72° C. the addition of a warmed solution of 98.0 g. of maleic anhydride in 150 g. of reagent grade xylene was begun and continued at a constant rate such that the addition was completed in 4.5 hours. Initially, 3.0 ml. of a 10.0 ml. benzene solution of 0.51 g. of azobisisobutyronitrile (AIBN) was added; the remaining 7.0 ml. was added in 0.5 ml. portions at 15 minute intervals over the following 3.5 hours.

During the addition period the temperature was maintained at 77.5° C.±0.5° C. with efficient mixing as the viscosity increased. After completion of the additions, the viscous solution was stirred and heated, gradually increasing the temperature to 75° C. during two hours. A sample of the mixture was withdrawn and dried two hours at 130° C.; the resulting dry brittle polymer sample weighed 2.3 g. and was dissolved in methyl ethyl ketone to give a 1.00% solution. The average specific viscosity of this 1% copolymer sample at 25° C. in methyl ethyl ketone, multiplied by 4, was 1.82.

The remaining hot copolymer solution was treated dropwise with heating and stirring with 267 g. of isobutanol, heated and stirred at 75° C. an additional three hours, cooled, and diluted with xylene to 1074 g., giving a 30% (copolymer solids) solution.

*Imidation.*—A 325 g. portion of the above copolymer solution (containing 0.300 mole maleic anhydride equivalent) was stirred in a 4-necked flask and heated (bath temperature 116° C.) with a thermostatted stirred oil bath. At 84° C. the copolymer solution was treated with about a 1 ml. portion of 20.4 g. of 3-(N,N-dimethylamino)-1,3-propanediamine. The temperature was allowed to increase for fifteen minutes and then a mixture of the remainder of this amine with 8.9 g. of N-(2-hydroxyethyl)ethylenediamine was added rapidly. The addition funnel was rinsed with 2–3 ml. of isobutanol, going into the flask, and then 100 ml. of xylene was added and the solution was heated (with distillation of wet solvents) during another hour at 130° C. This temperature of the mixture was maintained for seventy minutes. Then the stirred blue solution was aspirated to lower the temperature to 110° C. and distilled to leave the viscous residual polymeric imide solution, 134.8 g. This solution was calculated as containing 90% polymeric imide solids and 10% solvent (mainly xylene). While hot, this polymer imide was diluted with stirring with 2-propanol to 303.4 g. (40% solids); the viscosity, determined as described for the copolymer viscosity (2.50 g. of a 40% solution of the polymeric imide diluted to 100 ml. with methyl ethyl ketone) was 0.91. Titration of a sample with potassium hydroxide in methanol to the potentiometric end-point, indicated that carboxyl groups were still present to the extent of 9.3% of the initial maleic anhydride equivalence, i.e., the imidation reaction was 90.7% complete.

*Epichlorohydrination.*—A 60.7 g. portion of the above imidated copolymer solution, containing 0.060 maleic anhydride equivalent, was diluted to 69.4 g. with 2-propanol, treated with 41.6 g. of water, 0.52 ml. of concentrated hydrochloric acid, and then stirred and kept at 25° C. in a water bath and treated at once with 5.55 g. (0.060 mole) of epichlorohydrin. The initially heterogeneous mixture became homogeneous after 20 minutes. Samples (39.1 g. each) were withdrawn after 80, 100, and 125 minutes at 25° C. and each was immediately acidified with 3.7 g. of concentrated hydrochloric acid. After being agitated overnight at ambient temperatures the samples were heterogeneous and were made homogeneous by dilution with water to 63.5 g., 76.7 g., and 91.0 g. respectively. The last sample was evaluated as a chemical size for paper by application to an aqueous pulp slurry, sheeting the treated pulp, and drying the resulting sheet as usual. At the 0.3% application level (based on the dry pulp) with a like amount of a cationic starch ("Cato 8") the "off machine" modified penescope was 24 inches; after one day, 29.5 inches; after seven days 34 inches. After seven days the surface energy of the sized paper sheet was 37 dynes; the water pickup 253 mg./g. of paper; the wet tensile strength was 1.38 lb./inch.

EXAMPLE 15

This example illustrates the preparation of another chemical size polymeric product using oxo-decyl vinyl ether as the comonomer with the maleic anhydride.

*Copolymerization.*—To 184.3 g. of oxo-decyl vinyl ether heated as described in Example 14, 98.0 g. of maleic anhydride dissolved in 250 g. of xylene and added uniformly in 4.3 hours and the AlBN, 0.80 g. in 10 ml. of benzene was added as follows: 2.0 ml. initially, and the remainder in 0.5 ml. portions during 4 hours. An additional 80 ml. of xylene was added to promote mixing of the viscous solution during the two-hour completion period. This viscosity of the copolymer was 2.75 (four times 1% copolymer in methyl ethyl ketone).

Treatment with 233 g. of isobutanol, heating 3 hours, and dilution of the dissolved copolymer mixture to 937 g. with xylene completed the first step.

*Imidation.*—A 188.4 g. portion of the above solution was imidated by treating the copolymer solution with the same weights of amines as described in Example 14 above and heating for 70 minutes at 130° C., stripping to 78.1 g., and diluting to 181 g. with 2-propanol. The viscosity of the imidated copolymer thus obtained was 0.92 (4 times 1% imidated copolymer in methyl ethyl ketone) and the carboxyl content was 7.7%.

*Epichlorohydrination.*—To a 54.3 g. (0.060 mole) portion of the copolymer polyimide solution obtained above there was added 20.0 g. of water, 0.52 ml. of conc. hydrochloric acid and at 25° C., 5.55 g. of epichlorohydrin. The resulting clear solution was sampled after 75, 90, and 125 minutes of stirring. A 26.8 g. portion was acidified with 3.7 g. of conc. hydrochloric acid. Dilution of the final sample with water and evaluation thereof as a chemical size on aqueous cellulose pulp at 0.3% concentration, based on the dry pulp, sheeting the treated pulp into paper, drying the resulting paper showed the following modified penescope ratings:

| Time of test: | Modified penescope (inches) |
|---|---|
| "Off-machine" | 23.5 |
| One day | 31.5 |
| Seven days | 35.5 |

The surface energy of the treated sheet was 39 dynes, the wet tensile strength was 1.5 lb./inch, and the water pickup was 272 mg./g. of paper.

The dry tensile strength, as reported above, was determined in accordance with TAPPI Standard Method T 404 os–61 using a 1″ wide specimen and a 4″ initial jaw separation. The wet tensile strength was determined in accordance with TAPPI Standard Method T 456 m–49 using a 0.1% aqueous solution of hexadecyltrimethylammonium bromide for soaking the sample. The sizing reported is the resistance of the sheets to water and ink penetration. The water penetration resistance was determined by the hydrostatic pressure test, Standard Test Method (1) 18–52 (ASA designation L 14.59–1951), 1955 Technical Manual and Year Book of the American Association of Textile Chemists and Colorists, volume 31, page 124 (1955) except in that hydrostatic pressure was increased at a rate of $\frac{1}{10}$ inch per second instead of one centimeter per second, and in that the test endpoint was chosen as five drops of water instead of three. We call this the "modified penescope" test. The endpoint is reported as inches of hydrostatic head. Resistance to ink penetration was measured by the time required for a sample in contact with writing ink acidified to pH 1.5, and held at 32° C. to be reduced in brightness to approximately 85% of initial brightness. The endpoint is recorded in seconds of time.

The sizing method and compositions of the present invention are applicable to substantially all types of paper. Thus, the term "paper" is used herein in its broadest sense to designate any water-laid web of cellulosic, fibrous material.

The above description and particularly the examples are set forth for purposes of illustration only. Many other variations and modifications thereof will be apparent to those skilled in the art, and can be made without departing from the spirit and scope of the invention herein described.

What is claimed is:

1. A method which comprises (a) reacting an alpha-olefin/alpha, beta-olefinically unsaturated polycarboxylic acid anhydride polymer having from 2 to about 40 carbon atoms in the alpha-olefin moiety of said polymer and having a molar ratio of said anhydride to the alpha-olefin of from about 0.9:1 to about 1.8:1, with a diamine having at least one primary amino group; (b) heating the reaction mixture of step (a) to from about 110° C. to about 160° C. to form the alpha-olefin/imide-amine polymer therefrom; (c) reacting said alpha-olefin/imide-amine polymer of step (b) with an epihalohydrin in an amount sufficient to provide the resulting product with a ratio of epoxide groups to cyclic imide groups between about 0.1:1 and 1:1; (d) treating said epihalohydrinated reaction product of step (c) with sufficient acid to convert a preponderant proportion of the epoxide content of said reaction product to alcohols.

2. A method as described in claim 1 wherein the alpha-olefin moiety of said polymer used in step (a) is derived from straight chained hydrocarbon alpha-olefin, and said diamine is an alkylenediamine having from 2 to about 30 carbon atoms, said epihalohydrin used in step (c) is epichlorohydrin and said acid used in step (d) is hydrochloric acid.

3. A method as described in claim 1 wherein the alpha-olefin moiety of said polymer used in step (a) is derived from an alkyl vinyl ether having from about 8 to about 32 carbon atoms in said alkyl group, and at least one diamine used is an N,N-dialkylalkylene-diamine having from 1 to about 4 carbon atoms in each alkyl moiety and from 2 to about 20 carbon atoms in said alkylene group, said epihalohydrin used in step (c) is epichlorohydrin, and the acid used in step (d) is hydrochloric acid.

4. A method as described in claim 3 wherein the alpha-olefin moiety of said polymer used in step (a) is derived from a member of the group consisting of decyl vinyl ether and tridecyl vinyl ether, and the diamine used is a mixture of N,N-dimethylamino-1,3-propanediamine and N-(2-hydroxyethyl)ethylenediamine, said epihalohydrin used in step (c) is epichlorohydrin, and the acid used in step (d) is hydrochloric acid.

5. A method as described in claim 2 wherein said acidified product of step (d) is reacted with an alkaline material to convert the epichlorohydrinated reaction product to the corresponding epoxy compound.

6. A composition comprising the reaction product of an epihalohydrin with an alpha-olefin/imide-amine polymer formed by the reaction of an alpha-olefin/alpha, beta olefinically unsaturated polycarboxylic acid anhydride copolymer with a diamine containing at least one primary amino group, the alpha-olefin containing an average of from 2 to 40 carbon atoms, the ratio of said anhydride to the alpha-olefin in said copolymer being from about 0.9:1 to about 1.8:1, and the ratio of epoxide to cyclic imide groups in said epihalohydrinated reaction product being between about 0.1:1 and 1:1.

7. A composition as described in claim 6 mixed with a mineral acid in an amount sufficient to convert a preponderant proportion of the epoxide content of the epihalohydrinated reaction product to alcohols.

8. A composition as described in claim 6 wherein the epihalohydrin is epichlorohydrin, and the alpha-olefin/imide-amine polymer is the reaction product of an alpha-olefin hydro-carbon/maleic anhydride copolymer and a diamine of the formula

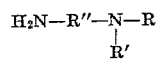

wherein R and R' are selected from the group consisting of hydrogen, alkyl groups containing from 1 to 22 carbon atoms, aralkyl groups containing from 7 to 10 carbon atoms, and hydroxyalkyl groups having from 2 to 4 carbon atoms, and R'' is an alkylene radical containing at least 2 carbon atoms.

9. A composition as described in claim 6 wherein the epihalohydrin is epichlorohydrin, and the alpha-olefin/imide-amine polymer is the reaction product of an alkyl vinyl ether/maleic anhydride copolymer having from about 8 to about 32 carbon atoms in the alkyl group and a diamine of the formula

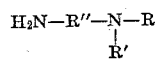

wherein R and R' are selected from the group consisting of hydrogen, alkyl groups containing from 1 to 22 carbon atoms, aralkyl groups containing from 7 to 10 carbon atoms, and hydroxyalkyl groups having from 2 to 4 carbon atoms, and R'' is an alkylene radical containing at least 2 carbon atoms.

10. A composition as described in claim 9 wherein the alkyl vinyl ether of the alkyl vinyl ether/maleic anhydride copolymer is decyl vinyl ether, and the diamine is a mixture of 3-(N,N-dimethylamino)-1,3-propanediamine and N-(2-hydroxyethyl)ethylenediamine.

11. A composition as described in claim 10 mixed with hydrochloric acid in an amount sufficient to convert a preponderant proportion of the epoxide content of the epihalohydrinated reaction product to alcohols.

12. A method of improving the properties of a water-laid cellulosic web which comprises (a) adding to an aqueous slurry of papermaking cellulosic fibers a polymeric composition described in claim 6, (b) adsorbing the polymeric composition on the fibers, and (c) forming the treated fibers thus obtained into a web.

13. A method for making a sized cellulosic web which comprises (a) adding to an aqueous slurry of papermaking fibers a polymeric composition described in claim 9, (b) adsorbing said composition on the fibers, and (c) forming the treated fibers thus obtained into a dried web, whereby there is obtained a web having increased resistance to penetration by liquids.

14. A method for preparing a sized cellulosic web as described in claim 13 wherein the polymeric composition added to the aqueous cellulosic fibers in step (a) is a composition of the reaction product of epichlorohydrin and a tridecyl vinyl ether/maleimide-amine polymer, which polymer is prepared by reacting a tridecyl vinyl ether/maleic anhydride copolymer with a diamine mixture of 3-(N,N-dimethylamino)-1,3-propylene-diamine and N-(2-hydroxyethyl)ethylenediamine, and heating the resulting reaction product to from 110° C. to 160° C. to form the tridecyl vinyl ether/maleimide-amine polymer, which epichlorohydrinated reaction product is treated with sufficient hydrochloric acid to convert a preponderant proportion of the epoxide content of said reaction product to alcohols.

15. Paper having improved properties comprising a water-laid web of fibers treated with a composition described in claim 6.

16. Paper having improved resistance to penetration by liquids comprising a water-laid web of fibers treated with sizing amounts of a composition described in claim 9.

17. A method which comprises adding an alkaline material to a polymeric composition described in claim 8 in water in an amount sufficient to raise the pH of the mixture to between about 9 and 11, adding said alkaline material treated polymeric composition to an aqueous slurry of cellulosic fibers, adjusting the pH of the resultant mixture to between about 4.5 and 8.5, and forming the thus treated cellulosic fibers into a web.

References Cited by the Examiner

UNITED STATES PATENTS 2,849,411   8/1958   Lehman et al.
3,157,595   11/1965  Johnson et al. _____ 162—168 X

FOREIGN PATENTS 711,404   6/1954   Great Britain.

DONALL H. SYLVESTER, *Primary Examiner.*

S. LEON BASHORE, *Assistant Examiner.*